May 13, 1947.  J. L. SPENARD  2,420,451
FISH LURE
Filed June 28, 1943
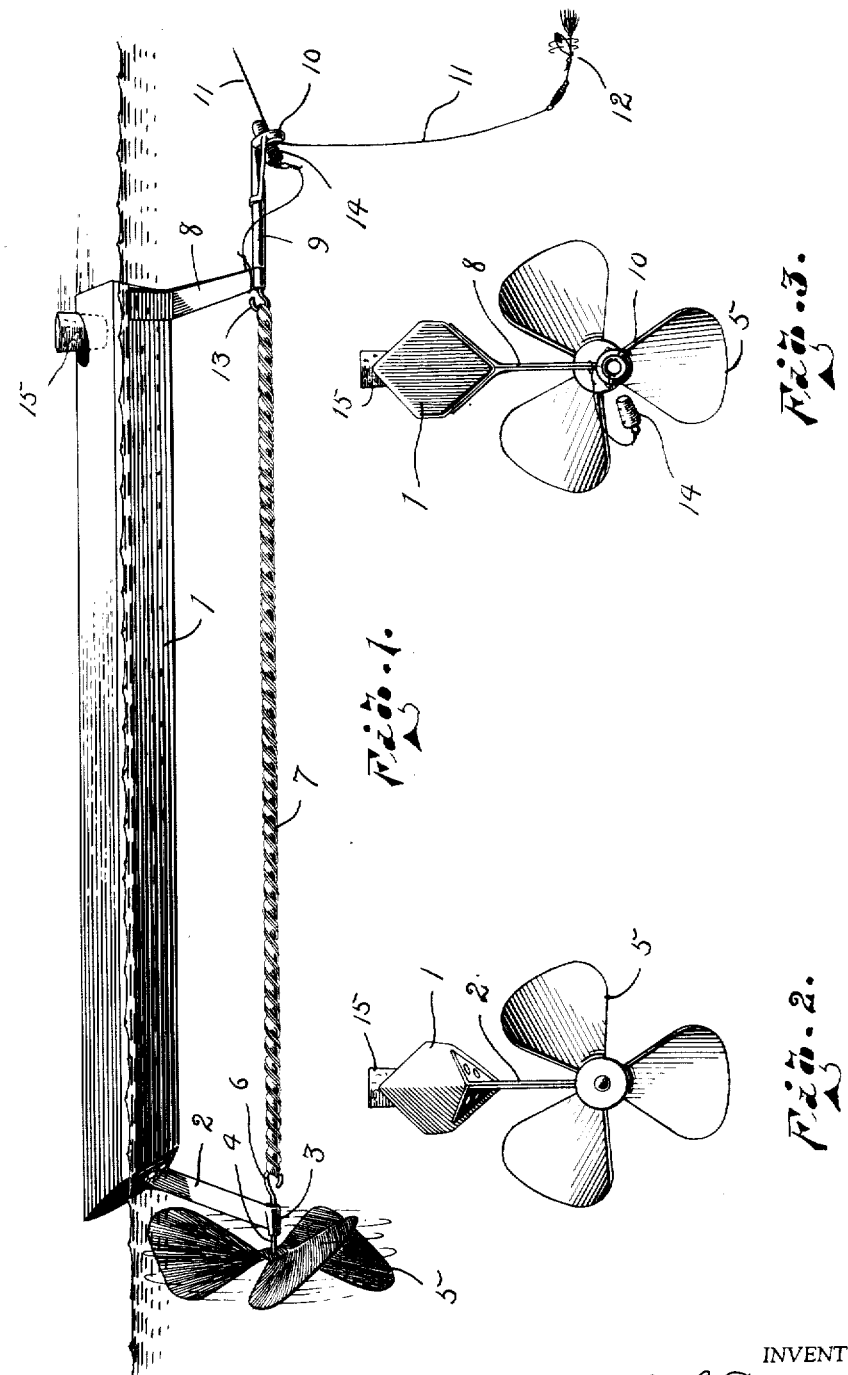
INVENTOR.
BY Joseph L. Spenard
Theo Stevens
atty.

Patented May 13, 1947

2,420,451

UNITED STATES PATENT OFFICE 2,420,451

FISH LURE

Joseph L. Spenard, Duluth, Minn.

Application June 28, 1943, Serial No. 492,635

3 Claims. (Cl. 43—43)

This invention relates to fish lures and especially to one embodying a combination of two adjustable united elements comprising a towing element and a towed element.

It is well known that fish many times are attracted by moving objects in the water and often even by quite large boats or other objects suggestive of action, or life therein, and, are prone to approach same, for investigation if nothing more, as frequently evidenced by their jumping out of the water in close proximity to such an object, though more often in search of food.

Thus one object of the present invention is to provide an unusually attractive lure and one as free as possible of any surrounding object that might frighten the fish.

Another object is to provide a lure having a towing element with as wide and distant range of activity from the operator as possible.

Another object is to provide an autotroller element of as simple and inexpensive construction as possible and one that may be readily recharged or energized at any distance from the operator and the direction of travel thereof changed at will and at any distance from the operator.

Still another object is to provide simple means for predetermining the depth of the trolled or catching element from the troller.

Other objects and advantages will appear in the further description thereof.

Referring now to the accompanying drawing forming part of this application and in which like reference characters indicate like parts:

Figure 1 is a side elevation of a completely equipped lure as would appear in the water.

Figure 2 is a front or bow elevation of the troller, and

Figure 3 is a rear or stern elevation of same minus the catching element normally trolled.

In the experimental specimen now in use the generally rectangularly shaped body 1 is wood and preferably of cedar due to its appropriate buoyancy, and for ordinary fishing approximately fourteen to sixteen inches long, though of course it may be of any material, shape or size desired.

Fixed to the inclined bow portion is the depending metal bracket 2 formed into a bearing or journal 3 for the propeller shaft 4, to the forward end of which is fixed the small three blade propeller 5, and the opposite end of this shaft terminates in either a suitable hook or eye 6 for holding one terminus of the doubled elastic band 7 which forms the power transmission means for the troller.

At the other end or stern of the body portion 1 is a similar depending bracket like member 8 having fixed in its lower extremity the rearwardly extending member 9 supporting upon its rearmost end the depending inclined eyelet 10 through which is threaded the fishing line 11 terminating in the spoon or other form of catching bait illustrated at 12.

From the inner face of the lower end of the bracket 8 extends another hook or eye 13 for reception of the adjacent end of the transmission band 7 as clearly illustrated.

As the fishing line 11 may be held with any desired length thereof acting as a lead for the hook, a tethered plug 14, made preferably of rubber, is provided for convenient plugging of the line within the eyelet 10 so that the desired length of lead is readily determined and temporarily fixed by means of said plug 14 before the troller is placed into the water for a trip.

Since it is desirable to reduce the cost of construction, the body portion 1 is made of a straight parallel sided member. It sometimes happens that, especially in rough water, a little more buoyancy is needed at the stern of the body member and I have found that a common cork such as illustrated at 15 placed in a properly registering hole at the stern of the body 1 answers the purpose admirably. Being thus equipped, when in rough water, as waves pass along the body portion and tend to submerge the cork, the slightly added buoyancy insures the bow remaining in proper relation to the surface of the water for keeping the propeller submerged, thus insuring a better riding troller.

The operation of the device is as follows:

When equipped as shown in Figure 1 of the drawing and about to be launched from a boat or shore as the case may be, the propeller is rotated in clockwise direction as viewed from in front of the device, until the rubber band 7 is well twisted up for the trip contemplated. The device is then lowered and liberated in the water, at which time it will immediately start away in the direction pointed, by the action of the propeller 5.

While thus traveling the hooked or catching member 12 will be trolled thereafter at whatever distance therefrom previously set. A fish may be at some distance watching for prey, and may see first the larger life-like troller skimming along close to the surface of the water, and as the fish would follow up to investigate it probably would notice the smaller more tempting catching object following along and seize upon it as food only to be caught and ultimately reeled in with the complete lure.

In the event of the lure reaching the end of a predetermined trip without a catch and the fisherman wishing to traverse about in the region of such ending, all that is necessary is to reel in quickly for a short distance, whereupon the forceful pulling backward of the troller will rewind the elastic by virtue of the propeller being forced to reverse its rotation in the water and when released again will start off doubtless in some other direction or as most readily determined by a jerk of the lure in one or another direction by the operator as he wishes.

The reenergizing of the elastic band by forcefully pulling backward of the propeller while in the water has proven quite a surprise in that the troller will travel an unexpected distance by such added energy.

Having thus described my invention, what I claim and desire to secure by Letters Patent is:

1. In an autotroller of the type described, an elongated buoyant body portion having a bow and stern, a bracket depending from said bow, a propeller and shaft therefor carried by said bracket, a bracket depending from said stern, a trolling line eyelet extending aft from said second bracket and carried thereby, and a double elastic band intermediate of the lower ends of said brackets and having one end secured to the lower end of said stern bracket and the other end secured to said propeller shaft substantially as and for the purpose described.

2. An autotroller of the type described comprising, an elongated buoyant body portion having a bow and stern, a propeller and shaft therefor carried at said bow, a trolling line eyelet depending from said stern and carried thereby, a fishing line held within said eyelet, power supplying means comprising elastic bands intermediate of and secured to said shaft and said stern, so constructed and arranged that a sudden backward stress on said line when said autotroller is floating in a body of water will serve to temporarily energize said power supplying means.

3. A troller of the type described having a buoyant body portion and self-propelling means to be energized for supplying forward motion to said troller: said propelling means comprising a propeller and shaft therefor carried at the forward end of said body and means comprising an elastic band intermediate of said shaft and the stern end of said body for energizing said propelling means end, and a fishing line depending from and adjustably carried at said stern, so constructed and arranged that a sudden backward stress on said line will re-energize said propelling means.

JOSEPH L. SPENARD.

REFERENCES CITED

The following references are of record in the file of this patent:

UNITED STATES PATENTS

| Number | Name | Date |
|---|---|---|
| 788,047 | Holz et al. | Apr. 25, 1905 |
| 1,274,238 | Caldbeck | June 30, 1918 |
| 1,362,781 | Chase | Dec. 21, 1920 |
| 1,850,296 | Vermeulen | Mar. 22, 1932 |

---

Certificate of Correction

Patent No. 2,420,451. May 13, 1947.

JOSEPH L. SPENARD

It is hereby certified that error appears in the printed specification of the above numbered patent requiring correction as follows: Column 4, line 20, claim 3, after "means" strike out the word "end"; and that the said Letters Patent should be read with this correction therein.

Signed and sealed this 8th day of July, A. D. 1947.

[SEAL]

LESLIE FRAZER,
*First Assistant Commissioner of Patents.* notice the smaller more tempting catching object following along and seize upon it as food only to be caught and ultimately reeled in with the complete lure.

In the event of the lure reaching the end of a predetermined trip without a catch and the fisherman wishing to traverse about in the region of such ending, all that is necessary is to reel in quickly for a short distance, whereupon the forceful pulling backward of the troller will rewind the elastic by virtue of the propeller being forced to reverse its rotation in the water and when released again will start off doubtless in some other direction or as most readily determined by a jerk of the lure in one or another direction by the operator as he wishes.

The reenergizing of the elastic band by forcefully pulling backward of the propeller while in the water has proven quite a surprise in that the troller will travel an unexpected distance by such added energy.

Having thus described my invention, what I claim and desire to secure by Letters Patent is:

1. In an autotroller of the type described, an elongated buoyant body portion having a bow and stern, a bracket depending from said bow, a propeller and shaft therefor carried by said bracket, a bracket depending from said stern, a trolling line eyelet extending aft from said second bracket and carried thereby, and a double elastic band intermediate of the lower ends of said brackets and having one end secured to the lower end of said stern bracket and the other end secured to said propeller shaft substantially as and for the purpose described.

2. An autotroller of the type described comprising, an elongated buoyant body portion having a bow and stern, a propeller and shaft therefor carried at said bow, a trolling line eyelet depending from said stern and carried thereby, a fishing line held within said eyelet, power supplying means comprising elastic bands intermediate of and secured to said shaft and said stern, so constructed and arranged that a sudden backward stress on said line when said autotroller is floating in a body of water will serve to temporarily energize said power supplying means.

3. A troller of the type described having a buoyant body portion and self-propelling means to be energized for supplying forward motion to said troller: said propelling means comprising a propeller and shaft therefor carried at the forward end of said body and means comprising an elastic band intermediate of said shaft and the stern end of said body for energizing said propelling means end, and a fishing line depending from and adjustably carried at said stern, so constructed and arranged that a sudden backward stress on said line will re-energize said propelling means.

JOSEPH L. SPENARD.

REFERENCES CITED

The following references are of record in the file of this patent:

UNITED STATES PATENTS

| Number | Name | Date |
|---|---|---|
| 788,047 | Holz et al. | Apr. 25, 1905 |
| 1,274,238 | Caldbeck | June 30, 1918 |
| 1,362,781 | Chase | Dec. 21, 1920 |
| 1,850,296 | Vermeulen | Mar. 22, 1932 |

Certificate of Correction

Patent No. 2,420,451.   May 13, 1947.

JOSEPH L. SPENARD

It is hereby certified that error appears in the printed specification of the above numbered patent requiring correction as follows: Column 4, line 20, claim 3, after "means" strike out the word "end"; and that the said Letters Patent should be read with this correction therein.

Signed and sealed this 8th day of July, A. D. 1947.

[SEAL]

LESLIE FRAZER,
*First Assistant Commissioner of Patents.*